Jan. 3, 1967   P. M. WING   3,295,759
PRESSURE BALANCED THERMOSTATIC VALVE
Filed April 7, 1965   2 Sheets-Sheet 1

INVENTOR
PHILIP M. WING
BY Charles A. Warren
ATTORNEY 3,295,759
PRESSURE BALANCED THERMOSTATIC VALVE
Philip M. Wing, East Hartford, Conn., assignor to United Aircraft Corporation, East Hartford, Conn., a corporation of Delaware
Filed Apr. 7, 1965, Ser. No. 446,205
3 Claims. (Cl. 236—93)

This invention relates to a balanced thermostatic valve.

Valves of this character, subject to movement as a function of a bi-metallic element or other temperature sensing means tend to be inaccurate if there is any substantial resistance to the movement of the valve rotor. A feature of this invention is a valve in which the rotor is substantially friction-free. Another feature is a valve construction in which pressure forces are balanced thereby minimizing the force required to move the valve rotor.

Other features and advantages will be apparent from the specification and claims, and from the accompanying drawings which illustrate an embodiment of the invention.

Figure 1:
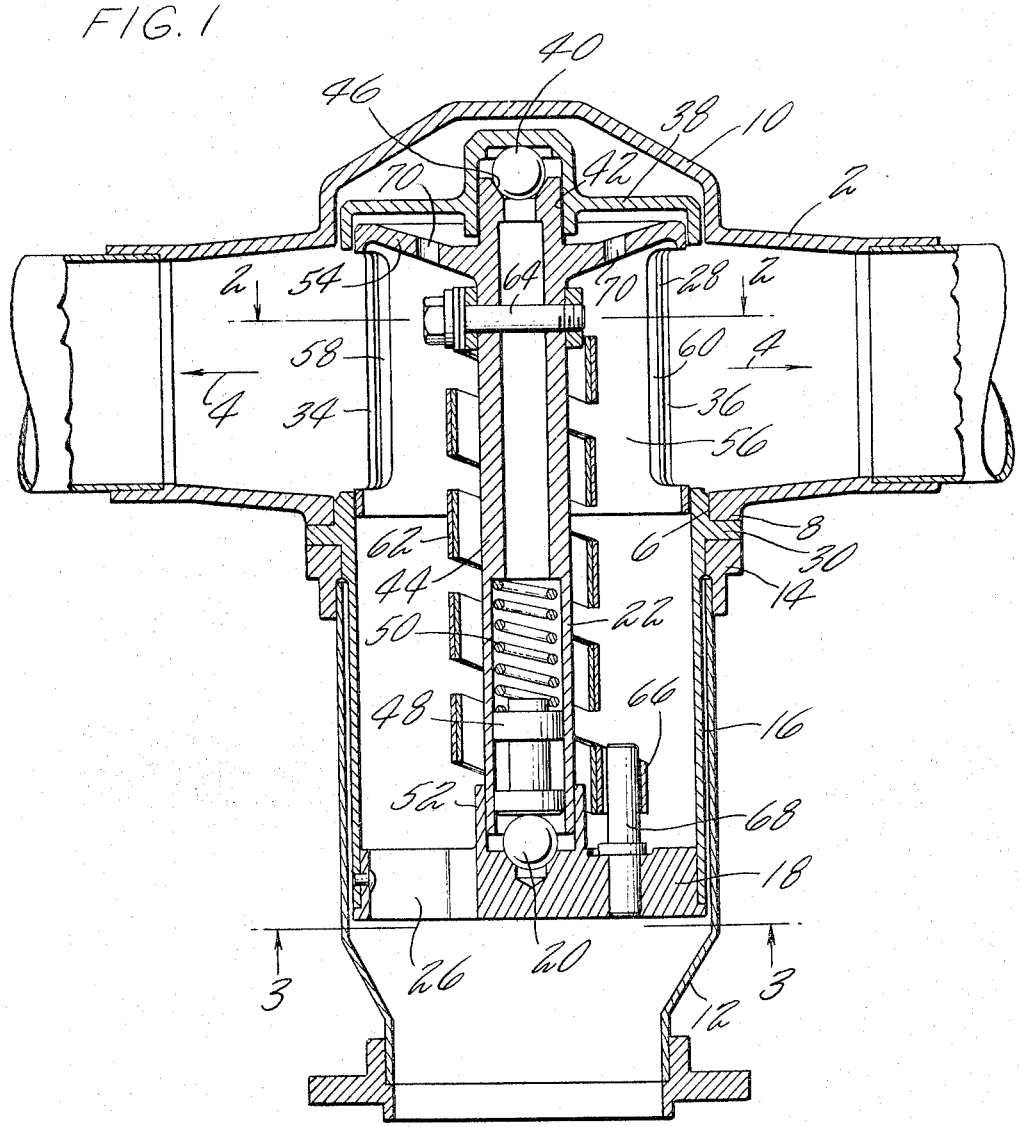
FIG. 1 is a sectional view through the valve.
Figure 2:
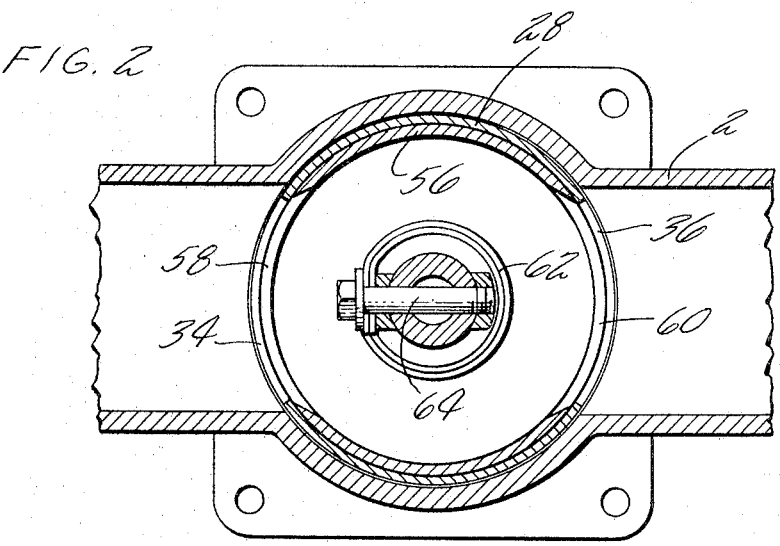
FIG. 2 is a sectional view along the line 2—2 of FIG. 1.
Figure 4:
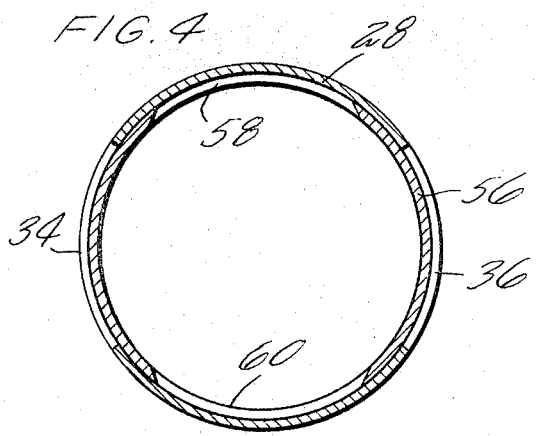
FIG. 4 is a fragmentary sectional view of a detail.

The valve has a main base 2 constituting an outlet duct and this duct is open at opposite ends so that there is an outward flow in opposite directions as indicated by the arrow 4, the flow arrangement in this way permits a balanced flow with respect to the valve construction. The base has a centrally located lateral opening 6 with a mounting flange 8 shown in better detail in FIG. 2. The base incorporates at the point opposite to the central opening 6 an offset portion 10 in which is located the support for one end of the valve rotor.

Figure 3:
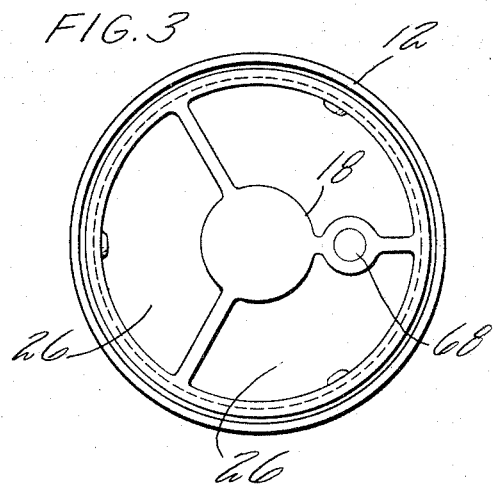
FIG. 3 is a sectional view along the line 3—3 of FIG. 1.

The valve inlet duct 12 extends at right angles to the outlet duct and constitutes a secondary base having a flange 14 at its inner end by which it may be attached to the flange 8 of the main base. Within the secondary base is a sleeve 16 which carries at one end a cap 18 which supports centrally thereof the ball bearing 20 for one end of the valve rotor 22. The other end of the sleeve 16 is effectively integral with a sleeve 28 later described in detail. The cap 18 is an open-work cap having a plurality of passages 26 therethrough for the flow of fluid, as shown in FIG. 3.

Positioned crosswise of the outlet duct and located within the main base 2 is a sleeve 28 having a flange 30 at one end located between the flange 14 and the flange 8 and held in position with these other flanges by bolts not shown. This sleeve 28 which is integral with sleeve 16 has opposite ports 34 and 36 therein in alignment with the passages defining the outlet duct in the main base and the end of the sleeve 28 is closed by a cap 38 which supports a ball bearing 40 centrally thereof for engagement by the end of the valve rotor 22 remote from the bearing 20. The cap 36 also has a cylindrical surface 42 engaging with the end of the rotor for guiding it. At the end of the sleeve 28 adjacent to the cap 38 there is clearance provided between the sleeve and the adjacent portion of the main base so that fluid flowing through the valve can flow into the space between the portion 10 of the main base and the cap 38.

The rotor includes a stem 44, one end of which engages directly with the ball 40 having a socket 46 therein to receive the ball. The other end of the stem has a plunger 48 therein urged toward the ball 20 and into engagement therewith within the stem and acting directly on the plunger. This end of the stem fits in and is guided by a cylindrical projection 52 on the cap 18. Integral with the stem is an end cap 54 at the outer edge of which is attached a sleeve 56 located within, concentric to and spaced radially from the surrounding sleeve 28. This sleeve 56 has opposed ports 58 and 60 movable more or less into aligment with the ports 34 and 36 as the valve is moved into a more open or more closed position.

A bi-metallic thermal element 62 arranged in the form of a helix is bolted as at 64 to the rotor stem at one end. The other end of the thermal element has a loop 66 extending over a pin 68 projecting from the cap 18. In this way fluid flowing through the inlet duct flows around the bi-metallic thermal element and depending upon temperature causes uncoiling or coiling of the helix to open or close the valve to a greater or lesser degree.

It will be apparent that fluid is allowed to enter the space above the cap 38, as above described. Fluid also enters the space between the cap 38 and the cap 54 on the rotor through passages 70 in the cap 54. By balancing the pressures in this way there is no end thrust exerted on the rotor by the fluid within the device and by providing oppositely located ports through which the fluid may flow the radial or lateral fluid pressures acting on the valve are also balanced. The rotor is free of any frictional drag except for the small amount exerted by the guiding surfaces 42 and 52 so that the rotor is substantially free of any resistance to turning when the thermal element applies a torque to the rotor.

It is to be understood that the invention is not limited to the specific embodiment herein illustrated and described, but may be used in other ways without departure from its spirit as defined by the following claims.

I claim:

1. A thermostatic valve including a main base forming an outlet duct and having a central lateral opening therein with a mounting flange surrounding said opening, a secondary base forming an inlet duct and attached at one end to said mounting flange, a first sleeve having opposed ports therein positioned within the main base with the ports aligned with the outlet duct, said sleeve having an integral end cap and a first bearing supported by said end cap, said sleeve having a flange coextensive with the mounting flange and attached thereto, a valve rotor positioned within the bases and comprising a stem coaxial with said inlet duct and a rotor sleeve supported by said stem within, concentric to and spaced from said first sleeve, said rotor sleeve having ports therein for alignment with the ports in the first sleeve, one end of the stem engaging said first bearing, a cap positioned within said secondary base and attached to said mounting flange, said cap having a bearing therein for engagement by the other end of the rotor stem, and a temperature sensitive element attached respectively to the cap and the stem for turning the stem in response to temperature changes in the fluid in said inlet.

2. A thermostatic valve as in claim 1 in which the stem includes at one end a plunger slidable within the stem and engaging with one of said bearings, and a spring within the stem acting on the plunger to hold it against the bearing.

3. A thermostatic valve as in claim 1 in which the rotor sleeve is supported on the stem by a flange adjacent to the end cap and in which the flange on the rotor sleeve is ported for transfer of pressure within the rotor sleeve to the space between the flange and the end cap.

References Cited by the Examiner
UNITED STATES PATENTS

| 1,940,090 | 12/1933 | Hetherington | 236—12 |
| 2,199,416 | 5/1940 | Paulson | 236—12 X |
| 2,244,808 | 6/1941 | Scott et al. | 236—93 X |

EDWARD J. MICHAEL, *Primary Examiner.*